(12) United States Patent
Kim et al.

(10) Patent No.: US 10,770,763 B2
(45) Date of Patent: Sep. 8, 2020

(54) BATTERY CELL TO WHICH BUS BAR IS APPLIED

(71) Applicant: LG Chem, Ltd., Seoul (KR)

(72) Inventors: Sun Kyu Kim, Daejeon (KR); Seok Koo Kim, Daejeon (KR); Jin Hyung Lim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/338,638

(22) PCT Filed: Jan. 11, 2018

(86) PCT No.: PCT/KR2018/000528
§ 371 (c)(1),
(2) Date: Apr. 1, 2019

(87) PCT Pub. No.: WO2018/155815
PCT Pub. Date: Aug. 30, 2018

(65) Prior Publication Data
US 2019/0237830 A1    Aug. 1, 2019

(30) Foreign Application Priority Data
Feb. 23, 2017 (KR) .......................... 10-2017-0024214

(51) Int. Cl.
| | | |
|---|---|---|
| *H01M 10/647* | (2014.01) | |
| *H01M 2/26* | (2006.01) | |
| *H01M 10/04* | (2006.01) | |
| *H01M 2/20* | (2006.01) | |

(Continued)

(52) U.S. Cl.
CPC ........... *H01M 10/647* (2015.04); *H01M 2/02* (2013.01); *H01M 2/0275* (2013.01); *H01M 2/20* (2013.01); *H01M 2/26* (2013.01); *H01M 2/266* (2013.01); *H01M 2/30* (2013.01); *H01M 10/04* (2013.01); *H01M 10/0413* (2013.01);
(Continued)

(58) Field of Classification Search
CPC .. H01M 10/647; H01M 2/20; H01M 10/0585; H01M 2/0275; H01M 10/052; H01M 2/02
See application file for complete search history.

(56) References Cited

U.S. PATENT DOCUMENTS

| | | |
|---|---|---|
| 2004/0038125 A1 | 2/2004 | Kim et al. |
| 2005/0168415 A1 | 8/2005 | Noda et al. |

(Continued)

FOREIGN PATENT DOCUMENTS

| | | |
|---|---|---|
| EP | 2500972 A1 | 9/2012 |
| JP | H110233201 A | 9/1998 |

(Continued)

OTHER PUBLICATIONS

International Search Report for PCT/KR2018/000528, dated Apr. 19, 2018.

(Continued)

*Primary Examiner* — Stewart A Fraser
(74) *Attorney, Agent, or Firm* — Lerner, David, Littenberg, Krumholz & Mentlik, LLP

(57) ABSTRACT

The present invention relates to a battery cell in which a foil functioning as a busbar is adopted in the battery cell, and thus, the resistance of the battery cell is reduced to increase the output of the battery cell.

12 Claims, 4 Drawing Sheets

(51) Int. Cl.
*H01M 10/0585* (2010.01)
*H01M 2/02* (2006.01)
*H01M 10/052* (2010.01)
*H01M 2/30* (2006.01)

(52) U.S. Cl.
CPC ..... *H01M 10/0436* (2013.01); *H01M 10/052* (2013.01); *H01M 10/0585* (2013.01)

(56) References Cited

U.S. PATENT DOCUMENTS

| | | |
|---|---|---|
| 2011/0129721 A1 | 6/2011 | Yang |
| 2011/0136000 A1 | 6/2011 | Moon et al. |
| 2013/0143109 A1 | 6/2013 | Kim et al. |
| 2013/0196210 A1 | 8/2013 | Kim et al. |
| 2013/0344419 A1 | 12/2013 | Yang |
| 2019/0054814 A1* | 2/2019 | Dawley ............. H01M 10/6556 |

FOREIGN PATENT DOCUMENTS

| | | |
|---|---|---|
| JP | 2005203192 A | 7/2005 |
| JP | 2006252855 A | 9/2006 |
| JP | 2011119256 A | 6/2011 |
| JP | 2011119264 A | 6/2011 |
| JP | 2013069417 A | 4/2013 |
| JP | 2013534361 A | 9/2013 |
| JP | 2013543228 A | 11/2013 |
| KR | 20060000101 A | 1/2006 |
| KR | 20080015165 A | 2/2008 |
| KR | 20120023491 A | 3/2012 |
| KR | 20120080148 A | 7/2012 |
| KR | 101193016 B1 | 10/2012 |
| KR | 20130119457 A | 10/2013 |
| KR | 20140083344 A | 7/2014 |
| KR | 20150005085 A | 1/2015 |
| KR | 20150079008 A | 7/2015 |
| KR | 20160017362 A | 2/2016 |
| KR | 20160131627 A | 11/2016 |

OTHER PUBLICATIONS

Extended European Search Report including the Written Opinion for Application No. 18758208.5 dated Jun. 24, 2019 pp. 1-8.

* cited by examiner

BATTERY CELL TO WHICH BUS BAR IS APPLIED

CROSS-REFERENCE TO RELATED APPLICATIONS

This application is a national phase entry under 35 U.S.C. § 371 of International Application No. PCT/KR2018/000528, filed on Jan. 11, 2018, published in Korean, which claims priority from Korean Patent Application No. 10-2017-0024214, filed on Feb. 23, 2017, the disclosures of which are incorporated herein by reference.

TECHNICAL FIELD

The present invention relates to a battery cell in which a foil functioning as a busbar is adopted inside the battery cell, and thus, the resistance of the battery cell is reduced to increase the output of the battery cell.

BACKGROUND ART

As the technological development and demand for mobile apparatuses have increased, the demand for secondary batteries also sharply increases, and among such secondary batteries, lithium secondary batteries which have high energy densities, high operation voltages, and excellent characteristics of preservation and service life are widely being used as energy sources for various electronic apparatuses as well as various mobile apparatuses.

Secondary batteries are roughly classified into cylindrical batteries, rectangular batteries, and pouch-type batteries according to structural features of exterior and interior. Among these, the rectangular batteries and the pouch-type batteries which can be stacked with a high degree of integration and have small widths relative to the lengths thereof particularly have drawn attention.

A secondary battery has an electrode assembly configured from a positive electrode plate, a separator, and a negative electrode plate, and is used such that an external connecting terminal is connected to the electrode assembly. At this point, the external connecting terminal may be connected in a single direction or in dual directions, and each external connecting terminal has one positive electrode terminal and one negative electrode terminal. In addition, when the secondary battery is lengthened in the longitudinal direction, there has been a limitation in that the internal resistance of a battery cell increases due to the resistance of foils constituting the positive electrode pate and the negative electrode plate, and thus, the output of the battery cell is decreased.

DISCLOSURE OF THE INVENTION

Technical Problem

As illustrate in FIG. 1, a typical battery cell is manufactured such that one electrode tap is formed in a single direction or dual directions on a positive electrode plate and a negative electrode plate of the electrode assembly constituting a battery cell, and an electrode lead is connected to the electrode tap.

The battery manufactured as such has no problem when used in a small-capacity usage battery, but may have a problem when used in a medium and large capacity usage battery in which a large current is used.

That is, in the case of a battery used for a vehicle or the like in which a high-energy characteristic is required, as the magnitude of current through a lead increases, the resistance of the positive electrode plate and the negative electrode plate inside the electrode assembly constituting a battery cell increases, and thus, the output of the battery cell decreases.

The present invention has been devised to address the above-mentioned limitations, and the purpose of the present invention is to provide a battery cell and a method for manufacturing the same, wherein two electrode taps are respectively formed on a positive electrode pate and a negative electrode plate of an electrode assembly, and a bus bar and the electrode taps are connected in parallel to distribute current through a electrode lead, so that the resistance of the positive electrode plate and the negative electrode plate constituting the electrode assembly is decreased, thereby preventing a decrease in the output of the battery cell.

Technical Solution

In accordance with an exemplary embodiment, a battery cell may include: an electrode assembly including a positive electrode plate and a negative electrode plate with a separator interposed therebetween; a first positive electrode tap and a second positive electrode tap which are connected to the positive electrode plate and provided to protrudingly extend from opposite ends of the positive electrode plate; a first negative electrode tap and a second negative electrode tap which are connected to the negative electrode plate and provided to protrudingly extend from opposite ends of the negative electrode plate; a cell cover configured to surround the electrode assembly so that at least portions of the first and second positive electrode taps and the first and second negative electrode taps are exposed outside of the cell cover; a first busbar facing an outer surface of the positive electrode plate, and having protrusion parts at positions respectively facing the first positive electrode tap and the second positive electrode tap, the protrusion parts respectively being connected to the first positive electrode tap and the second positive electrode tap; a second busbar facing an outer surface of the negative electrode plate, and having protrusion parts at positions respectively facing the first negative electrode tap and the second negative electrode tap, the protrusion parts respectively being connected to the first negative electrode tap and the second negative electrode tap; a positive electrode lead connected to one of the first positive electrode tap and the second positive electrode tap; a negative electrode lead connected to one of the first negative electrode tap and the second negative electrode tap; and a pouch case accommodating the electrode assembly and the first and second busbars so that at least portions of the positive electrode lead and the negative electrode lead are exposed outside of the pouch case.

The first positive electrode tap and the second positive electrode tap may be provided at opposite ends of an axis of the positive electrode plate, the axis of the positive electrode plate being parallel to an arbitrary side of the positive electrode plate.

The first negative electrode tap and the second negative electrode tap may be provided at opposite ends of an axis of the negative electrode plate, the axis of the negative electrode plate being parallel to an arbitrary side of the negative electrode plate, wherein the axis of the negative electrode plate is spaced apart from the axis of the positive electrode plate so that the positive electrode tap and the negative electrode tap do not overlap each other.

The first busbar and the second busbar may have thin plate shapes disposed to face each other with the electrode assembly interposed therebetween.

The first busbar may be made of an aluminum material.

The second busbar may be made of a copper material.

Areas of the first busbar and the second busbar may be not greater than an area of the electrode assembly.

The positive electrode lead and the negative electrode lead may extend in opposite respective longitudinal directions of the electrode assembly.

In accordance with another exemplary embodiment, a method for manufacturing a battery cell may include: an electrode assembly preparation step in which the electrode assembly is is surrounded by a cell cover and includes a separator interposed between a positive electrode plate having a first positive electrode tap and a second positive electrode tap extending from opposite ends thereof in opposite longitudinal directions thereof and a negative electrode plate having a first negative electrode tap and a second negative electrode tap extending from opposite ends thereof in the opposite respective longitudinal directions; a busbar connecting step in which the positive electrode plate and the first busbar are connected in parallel through the first positive electrode tap and the second positive electrode tap, and the negative electrode plate and the second busbar are connected through the first negative tap and the second negative tap; a lead connecting step in which a positive electrode lead is connected to one of the first positive electrode tap and the second positive electrode tap, and a negative electrode lead is connected to one of the first negative electrode tap and the second negative electrode tap; and a case assembly step in which the electrode assembly is accommodated in a pouch case.

In the electrode assembly preparing step, the positive electrode tap and the negative electrode tap may be disposed so as not to overlap each other such that: the first positive electrode tap and the second positive electrode tap are provided at opposite ends of an axis of the positive electrode plate, the axis of the positive electrode plate being parallel to an arbitrary side of the positive electrode plate; and the first negative electrode tap and the second negative electrode tap are provided at opposite ends of an axis of the negative electrode plate, the axis of the negative electrode plate being parallel to an arbitrary side of the negative electrode plate but being spaced apart from the axis of the positive electrode plate.

The first busbar and the second busbar may be thin metal plates disposed with the electrode assembly interposed therebetween.

Areas of the first busbar and the second busbar may be formed not to be greater than an area of the electrode assembly.

Advantageous Effects

A battery cell according to an exemplary embodiment may prevent a decrease in the output thereof while being used without a change in a typical module or a pack structure.

Figure 1:
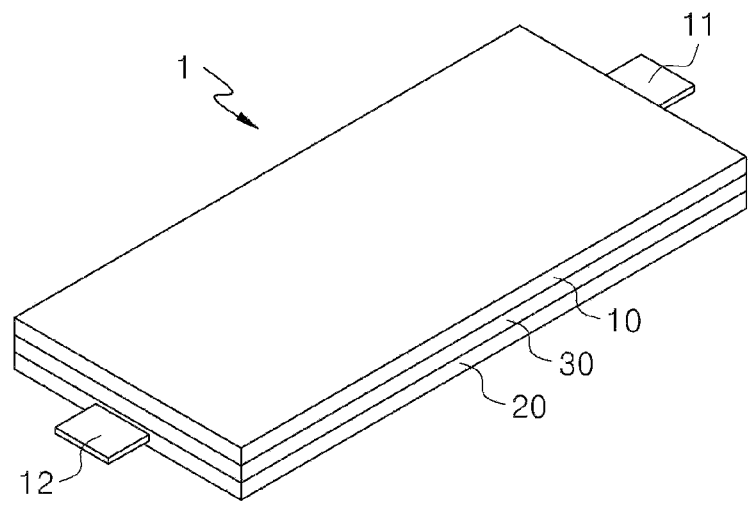
FIG. 1 is a schematic perspective view illustrating an electrode tap of a typical electrode assembly.

* It is clarified that the attached drawings are illustrated as a reference for understanding the technical concept of the present invention, and the scope of the present invention is not limited by the drawings.

MODE FOR CARRYING OUT THE INVENTION

It will be understood that the terms or words used in the specification and claims should not be construed as typical meanings or meanings defined in dictionaries but should be construed as meanings and concepts matching the technical spirit of the present invention, based on the principle that the inventor may properly define the concepts of the terms in order to explain his or her invention in the best mode.

Therefore, since embodiments described in the detailed description and configurations shown in the drawings are merely examples and do not cover all the technical spirits of an embodiment, it should be understood that various modifications and equivalents may be made to take the place of the embodiments at the time of filing this application. Moreover, a detailed description of a publicly known prior art related to the present invention in describing the present invention will be omitted if determined that it may unnecessarily obscure the gist of the present invention.

Figure 2:
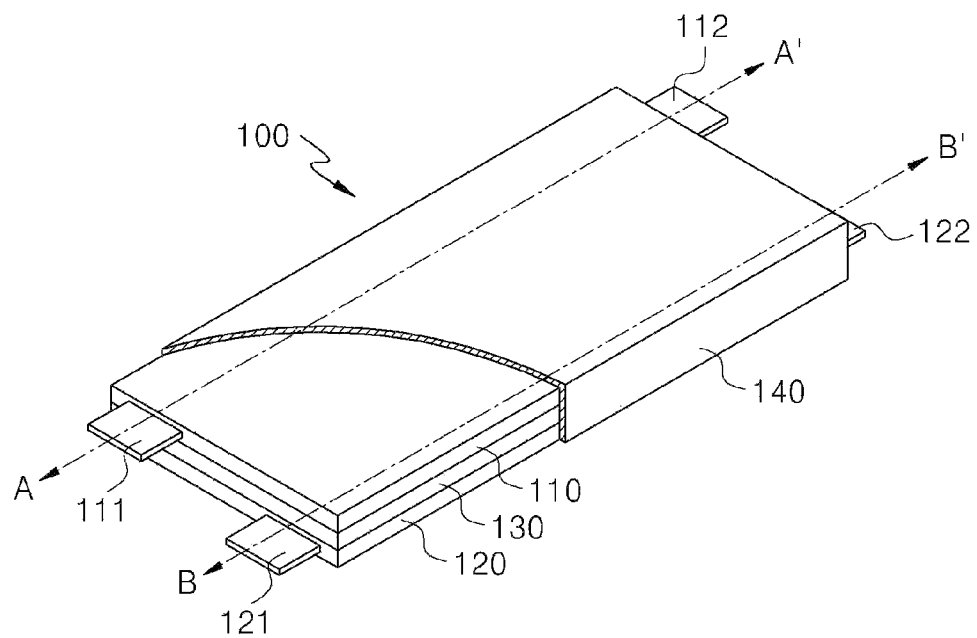
FIG. 2 is a schematic perspective view illustrating an electrode tap formed in an electrode assembly in a battery cell in accordance with an exemplary embodiment.
Figure 3:
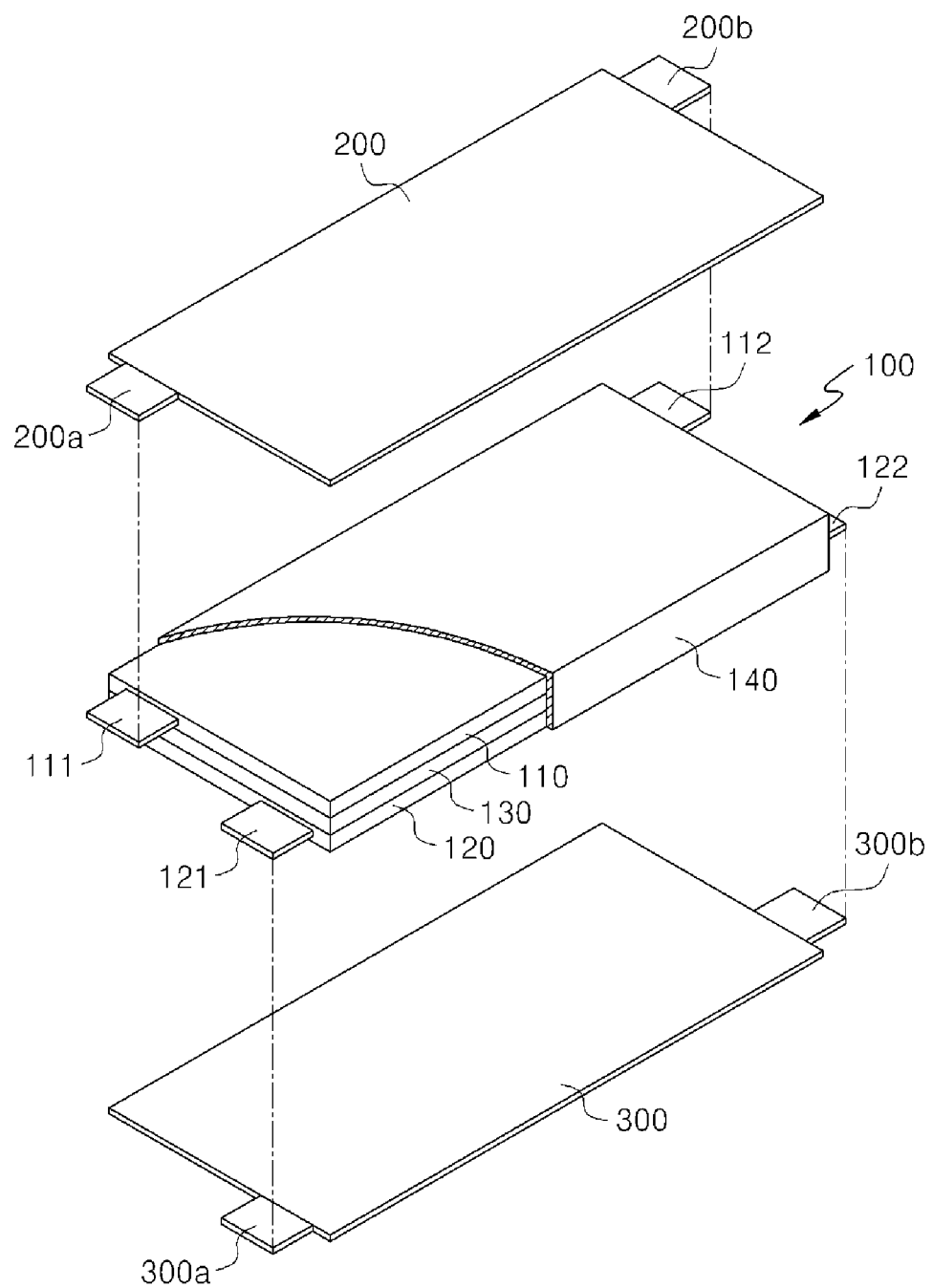
FIG. 3 is a perspective view illustrating connection of a busbar in a battery cell in accordance with an exemplary embodiment.
Figure 4:
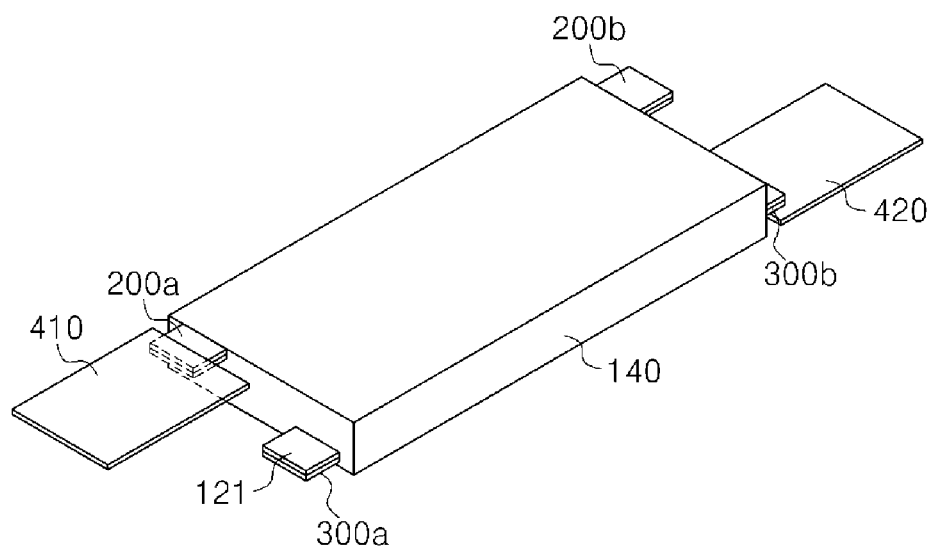
FIG. 4 is a perspective view illustrating jointing of an electrode lead in a battery cell in accordance with an exemplary embodiment.

FIG. 2 is a schematic perspective view illustrating an electrode tap formed in an electrode assembly in a battery cell in accordance with an exemplary embodiment, FIG. 3 is a perspective view illustrating connection of a busbar in a battery cell in accordance with an exemplary embodiment, and FIG. 4 is a perspective view illustrating jointing of an electrode lead in a battery cell in accordance with an exemplary embodiment.

Referring to FIGS. 2 to 4, a battery cell, to which a busbar in accordance with an exemplary embodiment is applied, may be provided to include: an electrode assembly including a positive electrode plate and a negative electrode plate with a separator interposed therebetween; a first positive electrode tap and a second positive electrode tap which are connected to the positive electrode plate; a first negative electrode tap and a second negative electrode tap which are connected to the negative electrode plate; a cell cover; a first busbar connected in parallel to the positive electrode plate; a second busbar connected in parallel to the negative electrode plate; a positive electrode lead and a negative electrode lead; and a pouch case.

As illustrated in FIG. 2, an electrode assembly 100 in accordance with an exemplary embodiment is provided by interposing a separator 130 between a positive electrode plate 110 and a negative electrode plate 120. Electrode active materials are applied on one surface of the positive electrode plate 110 and on one surface of the negative electrode plate 120.

A first positive electrode tap 111 and the second positive electrode tap 112 are connected to the positive electrode plate 110 and extend to protrude from both opposite ends of the positive electrode plate 110.

In addition, the first positive electrode tap and the second electrode tap are provided on both end portions of an axis A-A' of the positive electrode plate, the axis being parallel to an arbitrary side of the positive electrode plate.

A first negative electrode tap 121 and a second negative electrode tap 122 are connected to the negative electrode plate 120, and are provided to protrudingly extend from both ends facing each other in the negative electrode plate 120.

In addition, the first negative electrode tap 121 and the second negative electrode tap 122 are provided on both end portions of an axis B-B' of the negative electrode plate, the axis being parallel to an arbitrary side of the negative electrode plate 120. The axis B-B' of the negative electrode plate is configured different from the axis A-A' of the positive electrode plate and are disposed so that the positive electrode taps and the negative electrode taps do not overlap each other.

The axis A-A' of the positive electrode plate and the axis B-B' of the negative electrode plate are favorably disposed parallel to each other.

The electrode assembly in accordance with an exemplary embodiment is simply described as the electrode assembly 100 configured from the one separator 130 interposed between the one positive electrode plate 110 and the one negative electrode plate 120, but the embodiment of the present invention is not limited thereto.

For example, exemplary embodiments may be applied to various electrode assemblies, such as, a jelly-roll type (wound type) electrode assembly in which positive electrodes and negative electrodes which have elongated sheet shapes are wound while a separator is interposed therebetween, a stack type (laminated type) electrode assembly in which a plurality of positive electrodes and a plurality of negative electrodes which are cut into predetermined sizes are sequentially stacked while a separator is interposed therebetween, and a stack/folding-type electrode assembly which is a combined type of the jelly-roll type and stack type and in which unit cells in each of which a predetermined units of positive electrodes and the negative electrodes are stacked while a separator interposed therebetween are sequentially wound while being positioned on a separator.

In addition, electrode taps of the wound-type electrode assembly, the stack-type electrode assembly, and the stack/folding-type electrode assembly are provided facing the positive electrode plate and the negative electrode plate, and the directions of the axes of the positive electrode plate and the negative electrode plate are provided to cross each other, and thus, the positive electrode tap and the negative electrode tap may be disposed so as not to overlap each other.

The battery cell in accordance with an exemplary embodiment may further include a cell cover 140 which surrounds the outside of the electrode assembly 100 and provided so that at least portions of the first and second positive electrode taps and the first and second negative electrode taps are exposed to the outside.

In addition, the cell cover 140 may be provided to surround the periphery of the electrode assembly 100 to serve an insulation function.

Referring to FIG. 3, the first busbar 200 faces the outer surface of the positive electrode plate 110 and has protrusion parts 200*a* and 200*b* on positions respectively corresponding to the first positive electrode tap 111 and the second positive electrode tap 112.

In addition, the protrusion parts 200*a* and 200*b* are respectively connected to the first positive electrode tap 111 and the second positive electrode tap 112.

The connections may favorably be performed by welding through a welding method, such as ultrasonic welding, for welding a general electrode tap.

The positive electrode plate 110 is provided with the first busbar 200, so that the current flow through the positive electrode plate 110 is distributed to the positive electrode plate 110 and the first bus bar 200 and the resistance generated by the current is thereby reduced.

The second busbar 300 face the outer surface of the negative electrode plate 120 and has protrusion parts 300*a* and 300*b* on positions respectively corresponding to the first negative electrode tap 121 and the second negative electrode tap 122.

In addition, the protrusion parts 300*a* and 300*b* are respectively connected to the first negative electrode tap 121 and the second negative electrode tap 122.

The connections may favorably be performed by welding through a welding method, such as ultrasonic welding, for welding a general electrode tap.

The negative electrode plate 120 is provided with the second busbar 300, so that the current flow through the negative electrode plate 120 is distributed to the negative electrode plate 120 and the second bus bar 300 and the resistance generated by the current is thereby reduced.

In addition, the first busbar 200 and the second busbar 300 are formed in thin-plate shapes disposed facing each other with the electrode assembly 100 therebetween, and favorably have the areas that are not greater than the area of the electrode assembly 100, respectively.

The material of the first busbar 200 is favorably aluminum which is the same as the material of the positive electrode plate 110, and the material of the second busbar 300 is favorably copper which is the same as the material of the negative electrode plate 120.

The positive electrode lead 410 is connected to an external device by being connected to either of the first positive electrode tap 111 and the second positive electrode tap 112 which are connect to the protrusions 200*a* and 200*b* of the first busbar 200.

In addition, the negative electrode lead 420 is connected to an external device by being connected to either of the first negative electrode tap 121 and the second negative electrode tap 122 which are connect to the protrusions 300*a* and 300*b* of the second busbar 300.

At this point, the positive electrode lead 410 and the negative electrode lead 420 are provided in directions opposite to each other in the longitudinal direction of the electrode assembly 100.

Figure 5:
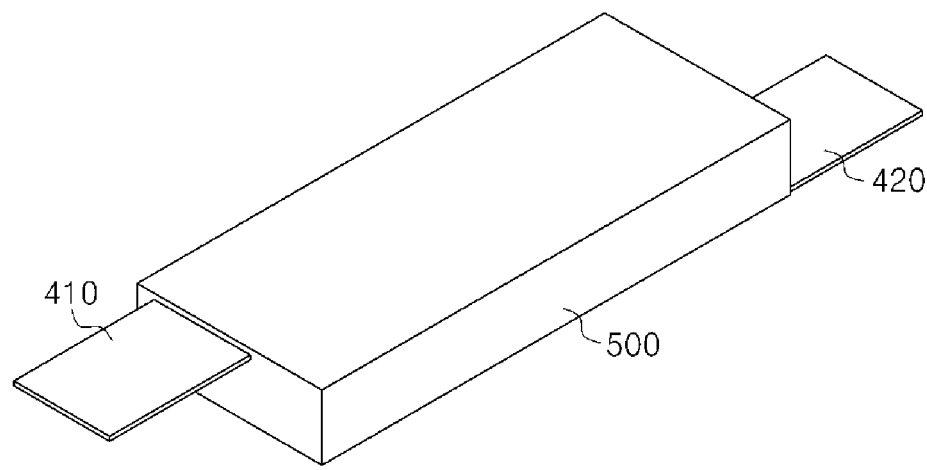
FIG. 5 is a perspective view of a battery cell in which a pouch case in accordance with an exemplary embodiment.

FIG. 5 is a perspective view of a battery cell to which a pouch case in accordance with an exemplary embodiment.

Referring to FIG. 5, a pouch case 500 causes at least portions of a positive electrode lead 410 and a negative electrode lead 420 are exposed, accommodates the electrode assembly surrounded by the first busbar, the second busbar, and the cell cover, and thus allows a battery cell to be completed.

Accordingly, the battery cell, to which a busbar in accordance with an exemplary embodiment is applied, may be used without a change in structures of conventionally used module or pack, and reduce the resistance generated in the positive electrode plate and the negative electrode plate, thereby preventing the decrease in the output of the battery cell.

Figure 6:
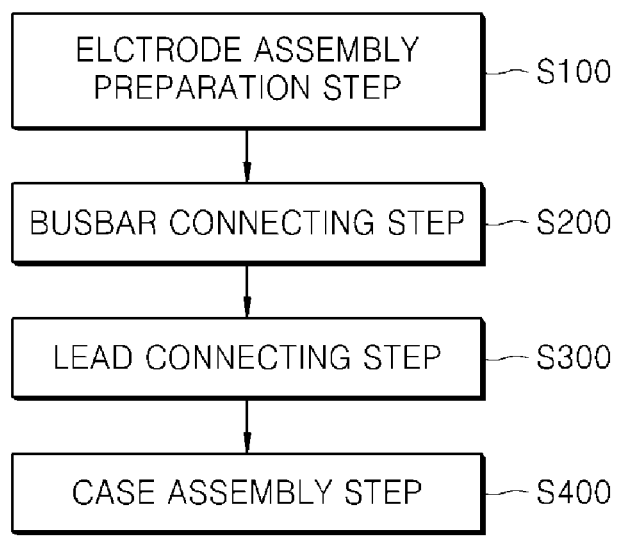
FIG. 6 is a flowchart illustrating a method for manufacturing a battery cell in accordance with an exemplary embodiment.

FIG. 6 is a flowchart illustrating a method for manufacturing a battery cell to which a busbar in accordance with an exemplary embodiment is applied.

Referring to FIG. 6, a method for manufacturing a battery cell with busbars applied thereto includes: an electrode assembly preparation step in which an electrode assembly is prepared, which is surrounded by a cell cover and having a separator interposed between a positive electrode plate having a first positive electrode tap and a second positive electrode tap on both ends thereof in the longitudinal direction thereof and a negative electrode plate having a first negative electrode tap and a second negative electrode tap on both ends thereof in the longitudinal direction thereof; a busbar connecting step in which the positive electrode plate and the first busbar are connected through the first positive electrode tap and the second positive electrode tap, and the negative electrode plate and the second busbar are connected through the first negative tap and the second negative tap; a lead connecting step in which a negative electrode lead is connected to either of the first positive electrode tap and the second positive electrode tap which are connected to the first busbar; and a case assembly step in which the electrode assembly to which the positive electrode lead and the negative electrode lead are connected is accommodated in a pouch case.

In the electrode assembly preparation step (S110), the electrode assembly is configured from a positive electrode plate, a negative electrode plate, and a separator interposed between the positive electrode plate and the negative electrode plate.

In addition, the positive electrode tap and the negative electrode tap may be prepared so as not to overlap each other such that: the first positive electrode tap and the second positive electrode tap are provided on both end portions of an axis of the positive electrode plate, the axis parallel to an arbitrary side of the positive electrode plate; and the first negative electrode tap and the second negative electrode tap are provided on both end portions of an axis of the negative electrode plate, the axis being parallel to an arbitrary side of the negative electrode plate but being configured different from the axis of the positive electrode.

The axis of the positive electrode plate and the axis of the negative electrode plate are favorably set parallel to each other.

In addition, a cell cover formation step may further be provided in which a cell cover is surrounded by the electrode assembly so that at least a portion of the first positive electrode tap and the second electrode tap, and a portion of the first negative electrode tap and the second negative electrode tap are exposed to the outside.

In the busbar connection step (S200), the first busbar and the second busbar are connected with the electrode assembly, which is surrounded by the cell cover, disposed therebetween.

In addition, the first busbar is connected to the first positive electrode tap and the second positive electrode tap, and the second busbar is connected to the first negative electrode tap and the second negative electrode tap.

The first busbar and the second busbar have thin metal plate shapes.

The areas of the first busbar and the second busbar are favorably not greater than the area of the electrode assembly surrounded by the cell cover.

In the lead connecting step (S300), a positive electrode lead is connected to either of the first positive electrode tap and the second positive electrode tap which are connected to the first busbar, and a negative electrode lead is connected to either of the first negative electrode tap and the second negative electrode tap which are connected to the second busbar.

However, the positions at which the positive electrode lead and the negative electrode lead are provided are configured to be in directions facing each other in the longitudinal direction.

In the case assembly step (S400), at least portions of the positive electrode lead and the negative electrode lead which are completed through the lead connection step are exposed, and the first busbar, the second busbar, and the electrode assembly surrounded by the cell cover is accommodated, and thus a battery cell may be completed.

DESCRIPTION OF SYMBOLS 1, 100 Electrode assembly
10, 110 Positive electrode plate
11 Positive electrode tap
20, 120 Negative electrode plate
21 Negative electrode tap
30, 130 Separator
111 First positive electrode tap
112 Second positive electrode tap
121 First negative electrode tap
122 Second negative electrode tap
140 Cell cover
200 First busbar
200a, 200b First busbar protrusion part
300 Second busbar
300a, 300b Second busbar protrusion part
410 Positive electrode lead
420 Negative electrode lead
500 Pouch case

What is claimed is:
1. A battery cell comprising:
an electrode assembly including a positive electrode plate and a negative electrode plate with a separator interposed therebetween;
a first positive electrode tap and a second positive electrode tap which are connected to the positive electrode plate and provided to protrudingly extend from opposite ends of the positive electrode plate;
a first negative electrode tap and a second negative electrode tap which are connected to the negative electrode plate and provided to protrudingly extend from opposite ends of the negative electrode plate;
a cell cover configured to surround the electrode assembly so that at least portions of the first and second positive electrode taps and the first and second negative electrode taps are exposed outside of the cell cover;
a first busbar facing an outer surface of the positive electrode plate, and having protrusion parts at positions respectively facing the first positive electrode tap and the second positive electrode tap, the protrusion parts respectively being connected to the first positive electrode tap and the second positive electrode tap;
a second busbar facing an outer surface of the negative electrode plate, and having protrusion parts at positions respectively facing the first negative electrode tap and the second negative electrode tap, the protrusion parts respectively being connected to the first negative electrode tap and the second negative electrode tap;
a positive electrode lead connected to one of the first positive electrode tap and the second positive electrode tap;
a negative electrode lead connected to one of the first negative electrode tap and the second negative electrode tap; and a pouch case accommodating the electrode assembly and the first and second busbars so that at least portions of the positive electrode lead and the negative electrode lead are exposed outside of the pouch case.

2. The battery cell of claim 1, wherein the first positive electrode tap and the second positive electrode tap are provided at opposite ends of an axis of the positive electrode plate, the axis of the positive electrode plate being parallel to an arbitrary side of the positive electrode plate.

3. The battery cell of claim 2, wherein the first negative electrode tap and the second negative electrode tap are provided at opposite ends of an axis of the negative electrode plate, the axis of the negative electrode plate being parallel to an arbitrary side of the negative electrode plate and spaced apart from the axis of the positive electrode plate so that the positive electrode tap and the negative electrode tap do not overlap each other.

4. The battery cell of claim 1, wherein the first busbar and the second busbar have thin plate shapes disposed to face each other with the electrode assembly interposed therebetween.

5. The battery cell of claim 4, wherein the first busbar is made of an aluminum material.

6. The battery cell of claim 4, wherein of the second busbar is made of a copper material.

7. The battery cell of claim 1, wherein areas of the first busbar and the second busbar are not greater than an area of the electrode assembly.

8. The battery cell of claim 1, wherein the positive electrode lead and the negative electrode lead extend in opposite respective longitudinal directions of the electrode assembly.

9. A method for manufacturing a battery cell, the method comprising:

an electrode assembly preparation step in which the electrode assembly is surrounded by a cell cover and includes a separator interposed between a positive electrode plate having a first positive electrode tap and a second positive electrode tap extending from opposite ends thereof in opposite longitudinal directions thereof and a negative electrode plate having a first negative electrode tap and a second negative electrode tap extending from opposite ends thereof in the opposite respective longitudinal directions;

a busbar connecting step in which the positive electrode plate and a first busbar are connected through the first positive electrode tap and the second positive electrode tap, and the negative electrode plate and a second busbar are connected through the first negative electrode tap and the second negative electrode tap;

a lead connecting step in which a positive electrode lead is connected to one of the first positive electrode tap and the second positive electrode tap, and a negative electrode lead is connected to one of the first negative electrode tap and the second negative electrode tap; and a case assembly step in which the electrode assembly is accommodated in a pouch case.

10. The method of claim 9, wherein in the electrode assembly preparing step, the positive electrode tap and the negative electrode tap are disposed so as not to overlap each other such that:

the first positive electrode tap and the second positive electrode tap are provided at opposite ends of an axis of the positive electrode plate, the axis of the positive electrode plate being parallel to an arbitrary side of the positive electrode plate; and the first negative electrode tap and the second negative electrode tap are provided at opposite ends of an axis of the negative electrode plate, the axis of the negative electrode plate being parallel to an arbitrary side of the negative electrode plate but being spaced apart from the axis of the positive electrode plate.

11. The method of claim 9, wherein the first busbar and the second busbar are thin metal plates disposed with the electrode assembly interposed therebetween.

12. The method of claim 11, wherein areas of the first busbar and the second busbar are not greater than an area of the electrode assembly.

* * * * *